Jan. 15, 1929.
R. E. REED
LINEAMETER
Filed June 9, 1927
1,699,207
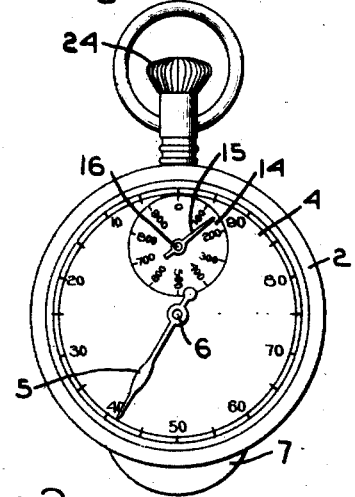
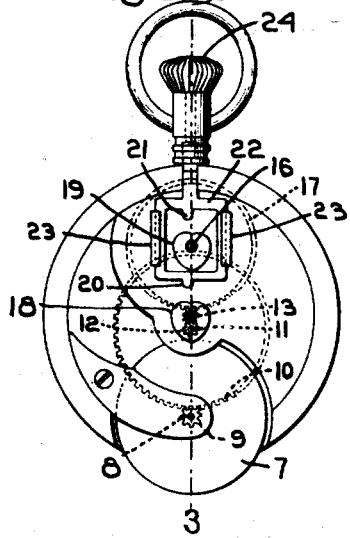
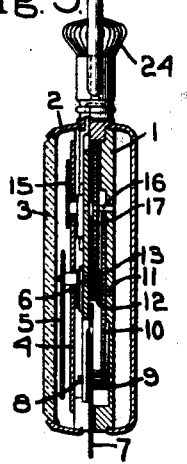
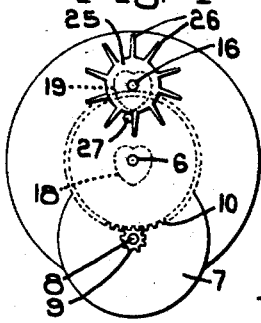
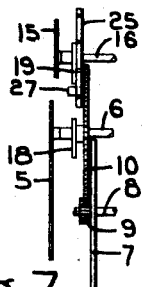
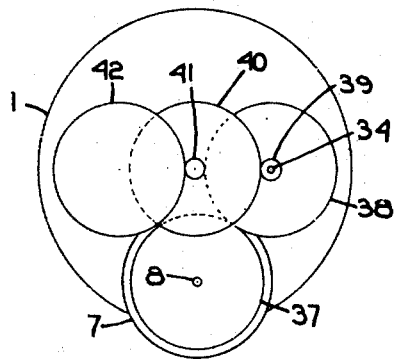
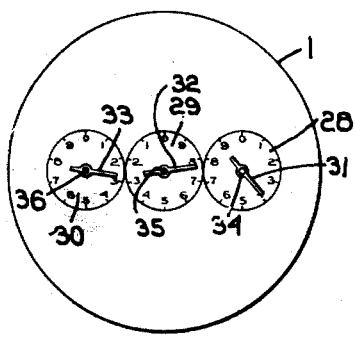
Inventor.
Royden E. Reed
by Heard Smith & Tennant.
Attys.

Patented Jan. 15, 1929.

1,699,207

UNITED STATES PATENT OFFICE.

ROYDEN E. REED, OF MANCHESTER, NEW HAMPSHIRE.

LINEAMETER.

Application filed June 9, 1927. Serial No. 197,723.

This invention relates to lineameters, which are implements for making linear measurements. These devices are frequently used by draftsmen, architects, and other persons having to do with drawings for the purpose of getting an accurate measurement of the length of lines on the drawings.

The present lineameters which are commonly made include a casing having a main dial graduated to indicate inches, an indicating pointer movable over the dial and a tally wheel journalled in the casing and projecting beyond the periphery of the casing, said tally wheel being geared to the pointer so that as the tally wheel is rolled along the line to be measured the rotative movement of the tally wheel will turn the indicating pointer.

As heretofore made these lineameters are constructed so that the reading of the dial indicates the exact or correct measure of the line. As a result if the device is used on drawings which are made to a reduced scale it is necessary to make a computation in order to arrive at the exact measurement which any line on the reduced drawing is intended to indicate. For instance, if the device is used on a drawing made on a quarter size scale and the measurement of a line as indicated by the lineameter was 4″ this would mean that the line on the drawing was intended to indicate a length of 16″.

The common practice for architects is to make their drawings on a reduced scale of one-quarter inch to the foot, and one of the objects of my present invention is to provide a lineameter which is so constructed that when used in connection with drawings on this scale any reading taken from the instrument will represent the correct length intended to be indicated by any line. In other words, the reading which is given by the lineameter will be four times the actual measurement of the line.

I accomplish this herein by providing a lineameter with a dial which is graduated to indicate feet and is preferably divided into divisions representing multiples of ten, and by providing a tally wheel of such a size and so geared to the indicating pointer that for every quarter inch of actual measurement on the drawing the pointer will be moved forward to indicate one foot on the dial. Thus when a device embodying my invention is used the reading given will be the correct length which is indicated by the blueprint and no computation will be necessary.

In order to give an understanding of the invention I have illustrated in the drawings a selected embodiment thereof which will now be described after which the novel features will be pointed out in the appended claim.

Fig. 1 is a face view of a lineameter embodying my invention;

Fig. 2 is a view showing the front cover and the dial removed;

Fig. 3 is a section on the line 3—3, Fig. 2;

Fig. 4 indicates a different train of gearing which may be used for connecting the tally wheel to the indicating pointer and embodying my invention;

Fig. 5 is an edge view of the train of gearing shown in Fig. 4;

Fig. 6 shows a different arrangement of dials;

Fig. 7 is a diagrammatic view showing the gearing for operating the dial shown in Fig. 6.

The device comprises a casing 1 having an open front similar to an open-faced watch, the front being closed by a removable bezel 2 carrying a glass crystal 3. Situated within the casing is a dial 4 which is graduated to indicate feet. 5 indicates the pointer which is pivotally mounted on an arbor 6 and which plays over the dial 4.

The main graduations on the dial 4 are preferably in multiples of ten as indicated and I find it convenient to so form the graduations that the complete distance around the dial indicates 100 feet although this is not essential.

The indicating pointer 5 is actuated from a tally wheel 7 which is pivoted in the casing on a pivot stud 8 and which projects beyond the casing. This tally wheel is geared to the arbor 6 of the pointer so that as the tally wheel is rolled along a line to be measured the pointer 5 will be rotated as usual in lineameters.

The size of the tally wheel 7 and the gearing connecting said tally wheel with the arbor 6 is such that the turning of the tally wheel through an arc of a quarter of an inch in length will advance the pointer 5 to indicate 1 foot. Where the main divisions of the dial 4 are in multiples of ten as shown I find it convenient to make the tally wheel 7 of such a size that its peripheral length is 2½" and with this arrangement one complete rotation of the tally wheel 7 will move the pointer ten points on the dial 4. Hence when the device is used on a drawing made on the scale of one-quarter inch to the foot the reading which the indicating pointer 5 gives on the dial 4 will be the true measurement indicated on the drawings and not the actual length of the line on the drawing. Thus if the drawing on the above scale has a line which is intended to indicate a 41 foot dimension in the full-sized structure represented by the drawing, such line will be actually only 10¼" long on the drawing. The measurement of such line by my improved lineameter will give a reading of 41 on the dial 4 which is the measurement that the operator wishes. With my improvement, therefore, it will not be necessary to make a mathematical calculation to compute the correct measurement from the reading given by the lineameter.

Any appropriate gearing connecting the tally wheel 7 with the arbor 6 may be employed without departing from my invention. As herein shown the arbor 8 of the tally wheel has a small pinion 9 thereon which meshes with a gear 10 on an arbor 11, said arbor having a pinion 12 thereon which meshes with another pinion 13 of equal size on the arbor 6. These gears are properly proportioned so that one rotation of the tally wheel 7 will rotate the pointer 6 to indicate 10 feet on the dial 4. With the arrangement shown, therefore, it will take ten rotations of the tally wheel 7 to give the pointer 5 one complete rotation. The device also includes an additional dial 14 graduated in hundreds, and co-operating with this dial is a pointer 15 on an arbor 16. The arbor 16 has a large gear 17 thereon which meshes with the pinion 13, the ratio between the pinion 13 and gear 17 being 1 to 10. Hence for each complete rotation of the pointer 5 the pointer 15 will be given one-tenth of a rotation.

Any usual means are employed for setting the pointers 5 and 15 to their zero position after a measurement is made. As herein shown the arbors 6 and 16 have heart cams 18 and 19 thereon. Co-operating with these cams are setting fingers 20, 21 carried by a sliding frame 22 which is movable in suitable guides 23 and is connected to the stem 24 so that by depressing the stem the setting fingers 20 and 21 will be brought into engagement with the heart cams 18 and 19 and the pointers will thereby be restored to their zero position.

In Figs. 4 and 5 I have illustrated a slightly different gearing for connecting the arbors 6 and 16. In this embodiment the arbor 16 has fast thereon a star wheel 25 having ten teeth 26 and the gear 10 is provided with a pin 27 adapted to engage the teeth 26 so that upon each rotation of the gear 10 the star wheel 25 and arbor 16 will be moved forward to the extent of one tooth or will be given one-tenth of a revolution of gear 10.

In Figs. 6 and 7 a different arrangement is shown wherein instead of having a large dial and a small dial I have provided three small dials 28, 29 and 30, the dial 28 indicating units, the dial 29 indicating tens and the dial 30 indicating hundreds. These dials have indicating pointers 31, 32 and 33 co-operating therewith, said pointers being fast on arbors 34, 35 and 36 respectively. The arbor 34 is directly geared to the tally wheel 7 and the arbors 35 and 36 are driven from the arbor 34 through a train of gearing. Fig. 7 shows the gearing. The arbor 8 of the tally wheel 7 has a gear 37 thereon which meshes with a gear 38 of similar size on the arbor 34 so that the pointer 31 will make one complete revolution for each rotation of the tally wheel. Since the tally wheel is 2½" in circumferential measurement each complete rotation of the tally wheel indicates a measurement of 10 feet on a drawing made on a scale of one-quarter inch to the foot and the dial 28 is shown as divided into tens so that one rotation of the pointer 31 indicates a measurement of 10 feet. The arbor 35 is connected to the arbor 34 by a ten-to-one gearing 39, 40 and the arbor 35 is connected to the arbor 36 by a ten-to-one gearing 41, 42.

In all embodiments of the invention the construction is such that when the device is used for getting a measurement on a drawing made on the above scale the reading of the instrument will give the correct or true measurement for the line in the full-sized or completed structure. This is a very great advantage as it saves the necessity of making mathematical calculations every time the device is used.

As stated above, the great majority of drawings used by architects and builders are on a scale of one-quarter inch to the foot. If, however, the drawings are on a scale of one-eighth inch to the foot then it would simply be necessary to multiply by two the reading given by the instrument. On the other hand, if the drawings were on a scale of one-half inch to the foot it would be necessary to divide by two the reading given by the instrument.

I claim:

A portable lineameter for use with drawings on a scale of one-quarter inch to the foot, said lineameter comprising a casing, a dial graduated to indicate feet with the main graduations arranged in multiples of ten, an indicating pointer co-operating with said dial, a tally wheel journalled in the casing and projecting beyond the same, said tally wheel having a circumferential measurement of two and one-half inches, and gearing connecting the tally wheel to the pointer by which each complete rotation of the tally wheel will move the pointer a distance to indicate ten feet on said dial, the portability of the lineameter permitting the lines of a drawing to be traced by the tally wheel and the pointer indicating in terms of feet the length of any line on the drawing traced by the tally wheel.

In testimony whereof, I have signed my name to this specification.

ROYDEN E. REED.